United States Patent [19]
Seiden

[11] 3,760,702
[45] Sept. 25, 1973

[54] TWIN LENS CAMERA SYSTEM WITH SLIDING BACK

[75] Inventor: Myron A. Seiden, Needham, Mass.

[73] Assignee: Polaroid Corporation, Cambridge, Mass.

[22] Filed: Jan. 3, 1972

[21] Appl. No.: 214,633

[52] U.S. Cl. .................................. 95/36 R, 355/46
[51] Int. Cl. ........................................ G03b 19/02
[58] Field of Search ....................... 95/36, 37, 38; 355/46, 54

[56] References Cited
UNITED STATES PATENTS

| | | | |
|---|---|---|---|
| 1,820,113 | 8/1931 | Bettini | 95/37 |
| 30,850 | 12/1860 | Wing | 95/37 X |
| 2,096,496 | 10/1937 | Huntzinger | 95/37 |
| 2,099,681 | 11/1937 | Draeger | 95/31 DS |

Primary Examiner—John M. Horan
Attorney—Robert L. Berger

[57] ABSTRACT

A camera system for producing a plurality of photographs from a single sheet of photographic material. A twin lens, sliding back system for such purpose. A first structure of this nature for producing photographs of one size for purposes such as portrait, identification, or record. A second structure of this nature as an adaptation of such first structure for producing photographs of a second, lesser size for purposes such as identification or record, for example, for photographs for attachment to data sheets, as paste-on for buttons, and the like. As useful in such camera systems, a camera back of unique configuration for receiving a film holder complementary to such configuration, and a unique assembly of a camera back with a film holder of less than the size usual to such back.

22 Claims, 22 Drawing Figures

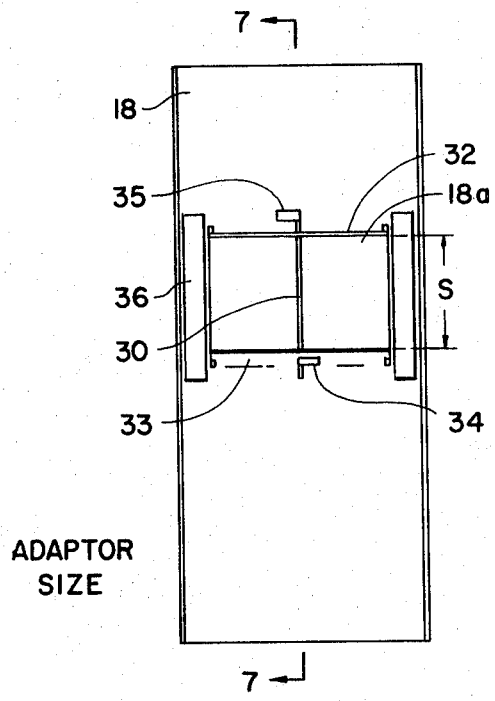
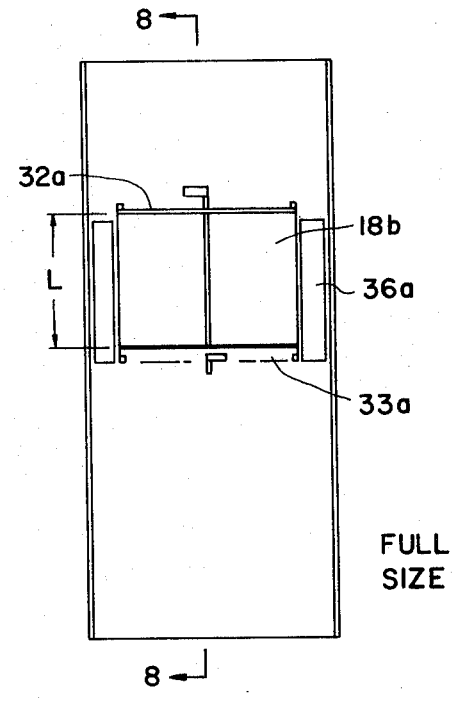
ADAPTOR SIZE
FIG. 5
FULL SIZE
FIG. 6
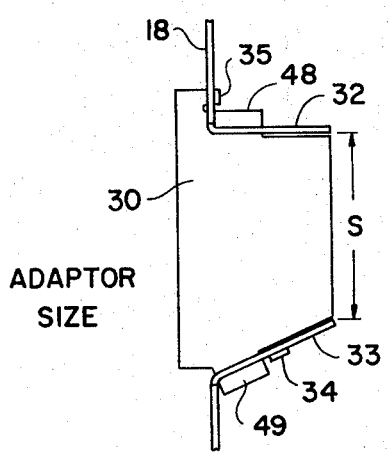
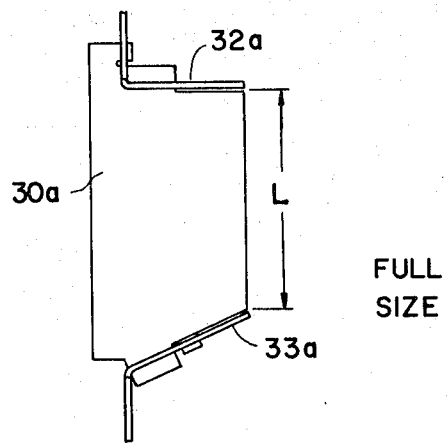
ADAPTOR SIZE
FIG. 7
FULL SIZE
FIG. 8

FULL SIZE

ADAPTOR SIZE

TWIN LENS CAMERA SYSTEM WITH SLIDING BACK

BACKGROUND OF THE INVENTION

1. Field of the Invention

This invention relates to photographic systems and has particular reference to systems for producing more than one photograph from a single sheet of photographic material.

2. Description of the Prior Art

The prior art discloses the multiple photograph concept in terms of a single lens system and a single sheet of photographic material. There are a number of examples of single lens camera systems having various means of moving a photographic sheet to present different areas of such a sheet to the lens for exposure. The U.S. Pat. Office classification, Class 95, sub-class 36 and 37, contains a number of patents showing such structures. An example is U.S. Pat. No. 2,172,283. Such structures are often complicated and made up of numerous parts such as levers and detents which require care and are subject to wear and possible consequent error.

In the prior art structure of U.S. Pat. No. 1,820,113, a photographic plate is travelled from an outside supply housing through a camera having two lens systems, in increments designed to produce images in different areas of the plate. The operation of this structure involves considerable and various manipulative steps to get a photographic plate from an outside supply into and through the camera.

SUMMARY OF THE INVENTION

This invention provides a twin lens camera with a sliding back as a simple, easily operated system for producing more than one photograph from a single sheet of photographic material.

This new system provides a capability of not only more than one, but more than two photographs from a single film sheet, simply by moving the sheet between two positions. At each such position, suitable operative structure may be provided so that both lens systems may be used, together or singly, to form images on the film sheet.

Further, the sliding back of this invention is an integral part of the camera operating system in that it carries the film sheet between such positions, with the interior of the camera back open for light access from the interior of the main body of the camera.

The unique combination of a twin lens system and a sliding back as provided by this invention, is further provided with manually operable and accessible camera back movement capability with snap-action, with special stop means, and with a labyrinth form of light barrier which is effective during the movement of the camera back as well as at such positions of the camera back. This keeps extraneous light from between the camera back and the main camera body with essentially zero friction in the labyrinth structure.

An application of this invention is in the production of more than one portrait photograph or more than one identification or record photograph from a single sheet of film in which essentially all of the available area of the film is used.

Another application of this invention is in the production from such a sheet, of more than one identification or record photograph, in a lesser size.

The same camera system is used as in the first mentioned application, with a suitable lens change to provide lesser magnification. This application is useful in situations in which a degree of film wastage is a secondary consideration.

A combination of this invention is an assembly usable in various photographic applications, of a camera back with a film holder of less than the size usual to such back.

A further application of this invention is in the production of identification or record photographs in a lesser size in which there is no significant film wastage. This is accomplished, again with suitable lens magnification change from the first application with film of lesser size, and with an adaptation of the structure of the system of the above mentioned applications to such lesser size film.

As an adjunct to the adaptation structure for the lesser size film, a camera back is provided with unique configuration to match a unique configuration provided in the film holder or film pack of such lesser size film. Thus, the lesser size film pack would not fit in or be accepted by a camera system other than one intended for that particular film pack. This area of this invention is useful in other photographic systems, in which it is desirable that only a particular combination of film holder and film holder mounting be used together. Such unique complementary structures are used for identification and/or orientation between the elements thereof.

By way of illustration and as an area of relative dimensional orientation, all of the above-mentioned applications may include camera back structure exemplified by the Polaroid Model CB-100 Land Camera Back presently marketed by Polaroid Corporation, Cambridge, Mass. which normally utilizes Polacolor Land Film Type 108 or Land Pack Film Type 107 marketed by the same company. Further, the lesser size photographs mentioned above may be made utilizing Polacolor Land Film Type 88, marketed by the aforementioned Polaroid Corporation for use normally in its Polaroid Square Shooter Land Camera, and which herein is utilized in a uniquely modified version of the Polaroid Land Model CB-100 Camera Back.

The particular lens systems used are matters of particular application needs, with selected unit area magnification.

The adaptation structure of the camera system for use with the lesser size film is, in the main camera body, a lesser size extension of a septum between the twin lens systems, camera back plate structure with a lesser size light aperture, and a pair of elongate stop bars of greater length to provide less distance between the camera back movement terminal positions. In the camera back, it is a larger spring for holding the lesser size film pack within the back.

The unique identification and orientation structure as between the camera back and the lesser size film pack is exemplified by a pair of side recesses in the back and a pair of side protuberances on the film pack.

In each use, i.e., with the larger and smaller film format, the camera system is arranged so that the sliding back is displaceable between two points equidistant from the optical axes of the twin lenses. This is accomplished with stop bars of a given length adapted for their respective ends to engage appropriate abutment surfaces of the camera back structure when using the larger format film, and with stop bars of a greater length adapted for their respective ends to engage the same abutment surfaces when using the smaller format film.

It is, therefore, an object of this invention to provide a new and improved camera system for producing more than one photograph from a single sheet of photographic film.

It is a further object of this invention to provide a multiple photograph camera with twin lens systems and a film carrying slidable back.

It is a further object of this invention to provide such a camera with adaptive structure for utilizing a film pack of lesser size than usual in such camera.

Another object of this invention is to provide a camera back suitable for such a camera and capable of operatively mounting a sheet of photographic material of lesser size than usual in such back.

A further object of this invention is to provide in combination, a camera back and a film holder of less size than usual for such back, for use in various photographic systems.

Other objects and advantages will be in part apparent and in part pointed out herein and in the accompanying drawings, wherein:

FIGS. 5 and 6 are rear face views of camera baffle back plate structures in explanation of this invention, in which FIG. 5 is the back baffle plate for the smaller adaptor size film and FIG. 6 is the back baffle plate for the larger size film;

Figure 2:
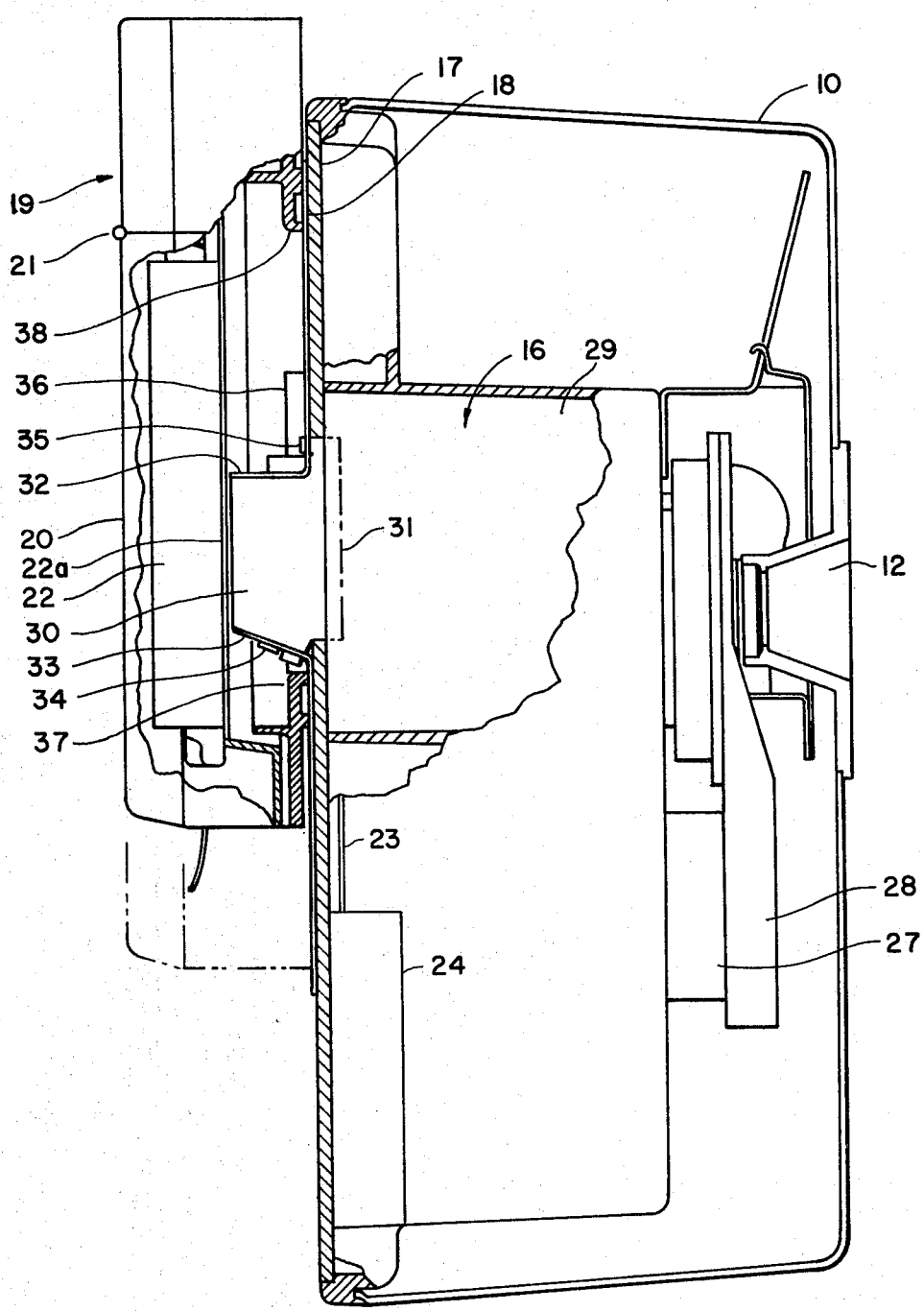
FIG. 2 is central vertical section of the structure of FIG. 1, partially cut-away and in part sectioned, taken generally along line 2—2 of FIG. 1.
Figure 9A:
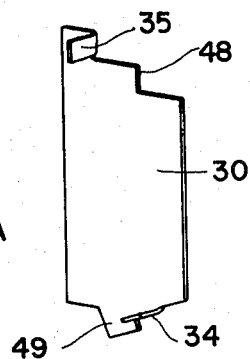
Figure 9:
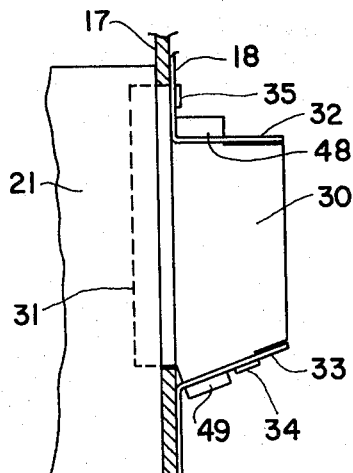
Figure 9B:
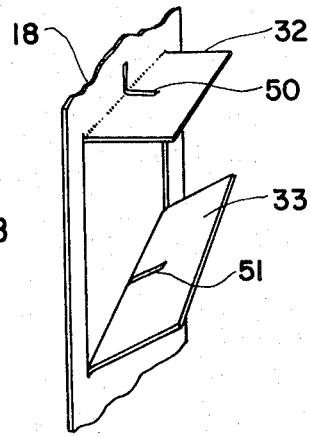
Figure 10:
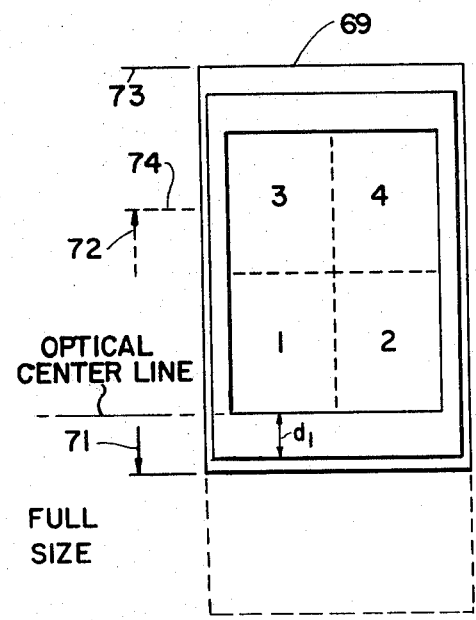
Figure 11:
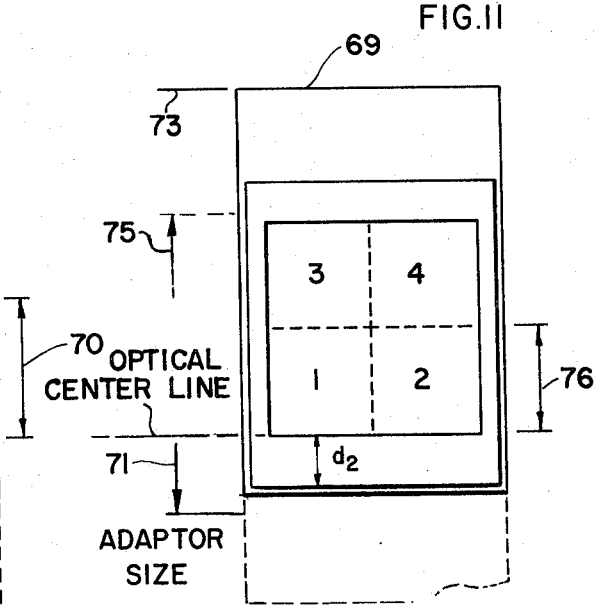
Figure 12:
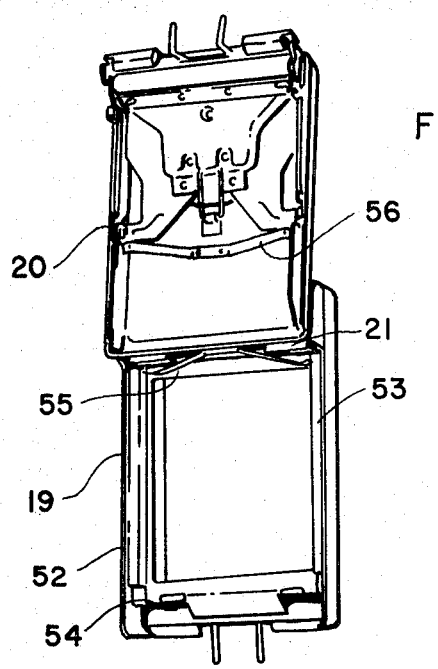
Figure 12:
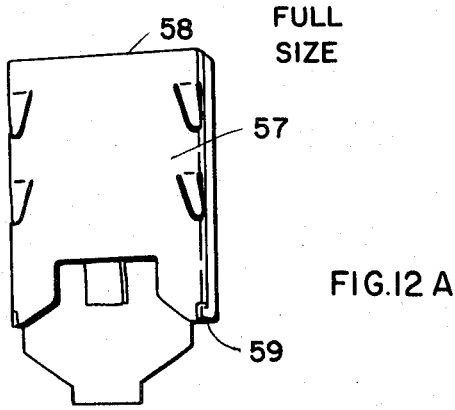
Figure 13:
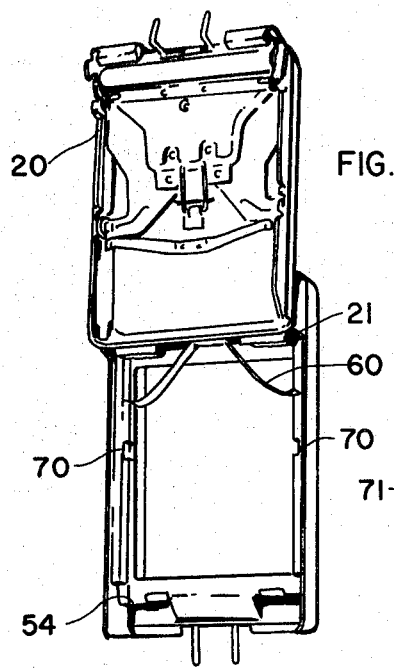
Figure 13A:
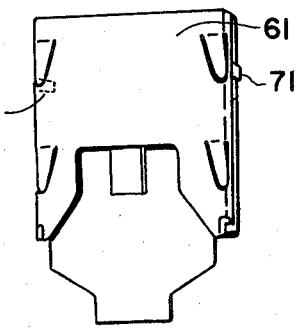
Figure 14:
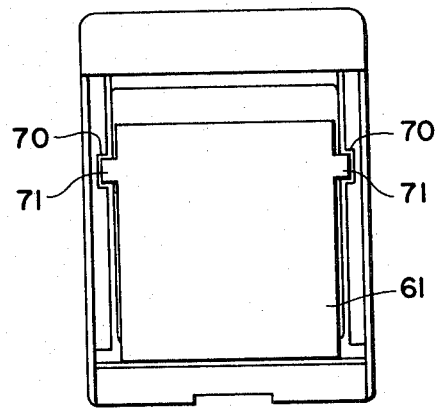
Figure 15:
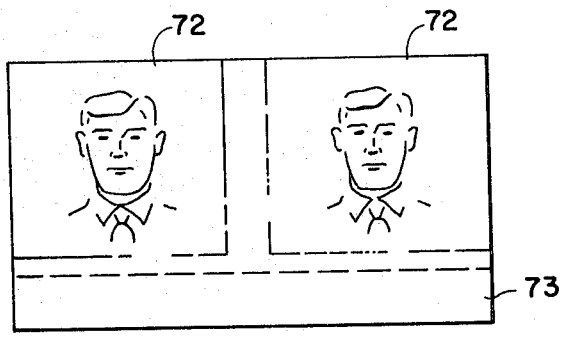
Figure 16:
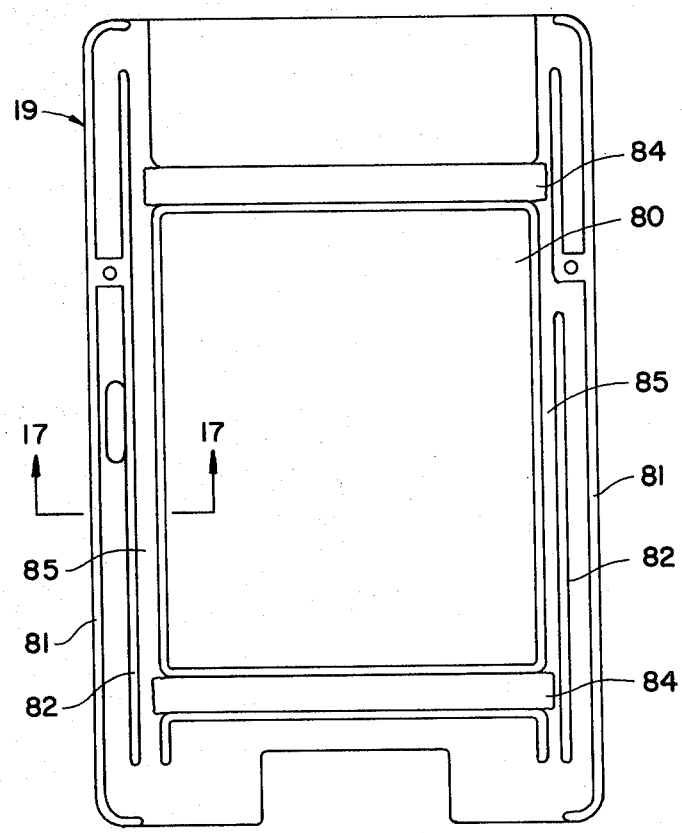
Figure 17:
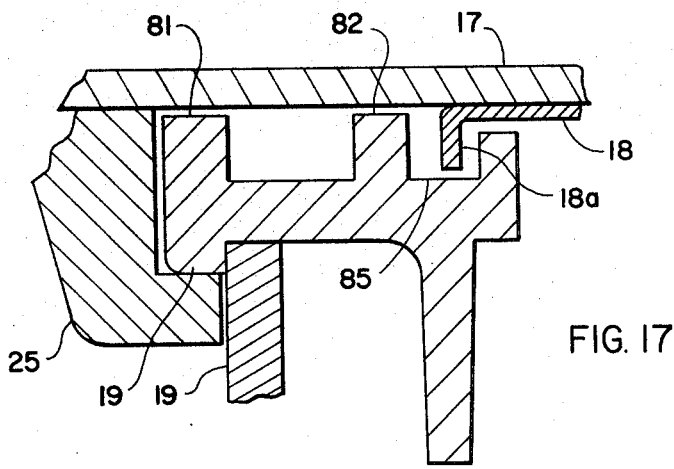

FIGS. 7 and 8 are partial vertical sections of the structures of FIGS. 5 and 6 respectively, taken on lines 7—7 and 8—8 of FIGS. 5 and 6 respectively;

FIG. 9 is a development of FIG. 7, illustrating the vertical central septum structure of a camera system according to FIG. 2;

FIG. 9A is a perspective detail of the septum extension of FIG. 9;

FIG. 9B is a perspective detail of the baffle structure of FIG. 9;

FIGS. 10 and 11 are schematic illustrations, with respect to the four picture camera structure of FIG. 2, of the usual size film pack, FIG. 10, and the smaller size film pack, FIG. 11, in terms of four image areas on a single sheet of photographic material, as accomplished by the double lens and movable back structure of camera system according to this invention;

FIGS. 12 and 12A respectively illustrate the full size camera back and the full size film pack therefor;

FIGS. 13 and 13A respectively illustrate the full size camera back and the smaller size film pack, therefore, according to this invention;

FIG. 14 is a schematic illustration of a full size camera back with a smaller than usual film pack mounted therein, with mutually cooperating locating and orienting structure;

FIG. 15 is a schematic showing of film for small photograph areas on half of a full size film, illustrative of this invention;

FIG. 16 is a view of the sliding face of the camera back unit according to this invention;

FIG. 17 is a section of FIG. 16, taken on line 17—17.

Figure 1:
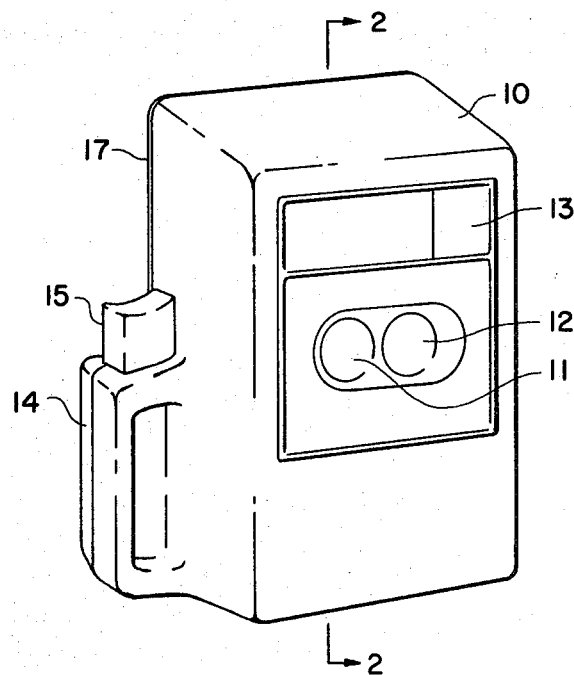
FIG. 1 is a front perspective of a two lens camera according to this invention, in a system capability of four pictures per sheet of film.

With reference to FIG. 1, a twin lens camera according to this invention is shown, with a main housing 10 and a pair of lens units 11 and 12 in the front of the housing. An elongate light aperture 13 is provided across the front of the housing, above the lens units 11 and 12. Light is transmitted through this aperture from a flash unit within the housing, to illuminate a subject as a picture is taken. An aiming light within the housing also uses this aperture in directing a light beam at the subject for aid in positioning the camera properly with respect to the subject. On the sides of the camera, handles are provided, as illustrated at 14, and a camera system actuator button 15 is located in the top of one of these handles, as shown. A camera back plate is indicated at 17.

Figure 1A:
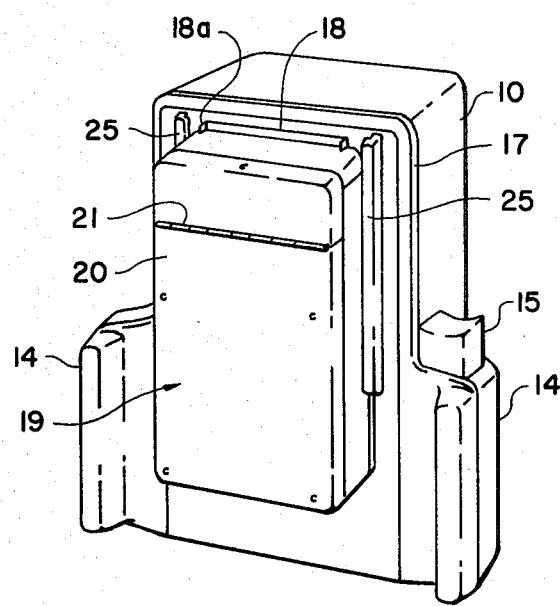
FIG. 1A is a rear perspective of the structure of FIG. 1.

FIG. 1A, as the rear view of the FIG. 1 structure, shows, in addition to the camera back plate 17, a portion of a back baffle plate 18, with upturned side edges 18A as part of a light barrier system. A pair of guide rails 25 are mounted on the back plate 17 and a camera back unit 19 is slidably mounted in the guide rails 25. The camera back unit has a cover 20, hinged at 21 as a means of access for loading film packs.

Figure 3:
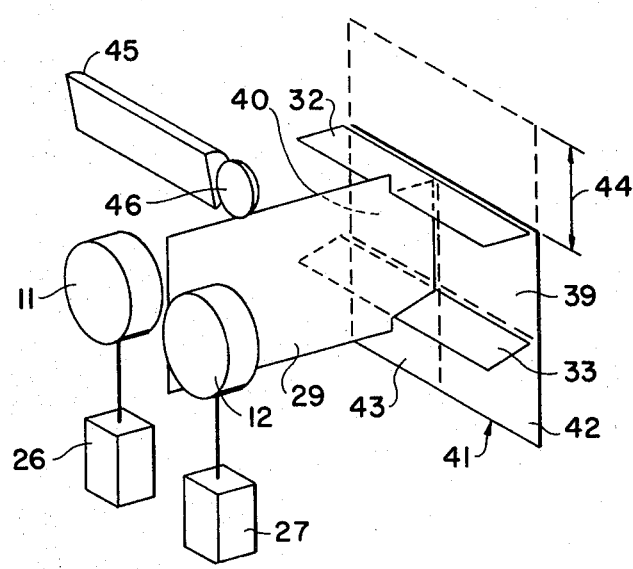
FIG. 3 is an operational schematic of a four picture embodiment of this invention.

FIG. 2 is an illustrative form of internal camera structure for a four picture, single film sheet system, according to this invention and as schematically shown in FIG. 3.

This camera system is provided with the main, front section 10 containing the optical system as at 11, 12, and the back section 19 containing photographic film in a film pack 22 to present a sheet of film at a focal plane 22A. This back section is movable between up and down positions, to present different areas of a photographic sheet in the film pack 22 to the optical system for imaging of subjects thereon by such optical system.

In FIG. 2, the housing 10 is provided with central inner chambers 16 extending from the camera front and from the lens units 11 and 12, to a back plate 17 as the rear wall of the housing 10. A back baffle plate 18 is mounted on the rear of the back plate 17 and the camera back unit 19 is mounted on the assemblage of the back plate 17 and baffle back plate 18 for movement vertically with respect to the main camera housing. The movable back unit 19 is provided with the rearwardly and upwardly openable cover 20, hinged as at 21. The film pack 22 is removably secured within the movable back unit 19 for movement therewith along the focal plane 22A to selectively present each of two halves of the available area of each sheet of film for exposure in line with the light passage chambers 16 and through suitable light openings in the back plate 17 and in the back baffle plate 18.

The camera is operated, in any one position of the back 19, either up or down, by depressing the actuator button 15 of FIG. 1 on a spring return basis. In FIG. 2, an extension 23 of the button 15 is consequently moved to operate microswitches in a switch facility 24. A number of microswitches are used in this manner, to operate shutters in lens units 11 and 12 through solenoids 26 and 27, and to actuate a flash unit and such other devices as may be suitable to a particular system, in such order as may be required for such system. The solenoids 26 and 27 are mounted on support means 28 below the lens units 11 and 12. It should be noted that the particular arrangement employed for firing the electronic flash unit, actuating the camera shutters, etc., does not form part of the present invention and as such may take any suitable form in addition to that indicated.

The central chamber 16 is divided into two subchambers by a vertical, central septum 29 which may be formed of structural plastic, and which provides separate light passage chambers for each of the lens units 11 and 12. At the rear of the chambers 16, a metal baffle 30 is provided as an extension of the septum 29. The septum extension 30 is mounted on and through the baffle back plate 18. It extends forward through the opening in the back plate to seat in a vertical end slot 31 in the septum 29, and it extends rearward through the opening in the back baffle plate to a point close to the focal plane 22A. The back baffle plate 18 has its light opening framed, top and bottom, by somewhat horizontally disposed baffle plates 32 and 33 respectively. Thus, in any one position of the movable back 19, the septum extension 30 and the baffle plates 32 and 33, with the inner side walls of the camera back, define an image area on the film in the pack 22 for each of the lens units 11 and 12. This area is half the available film area and provides for two side by side images. The septum extension 30 is secured to the baffle back plate 18 by finger tabs illustrated at 34 and 35, in clamping assembly. Stop members 36 are mounted on the back of the back baffle plate 18, in the form of vertical bars. In the up position of the back 19, the bottoms of the stops 36 engage an upwardly facing abutment form 37 in the back 19. In the down position, the tops of the stops 36 engage a downwardly facing abutment form 38 in the back 19. Thus, the structure of FIG. 2 provides the camera with a four picture capability, one on each side of the septum 29 for each position of the back 19.

FIGS. 9, 9A, and 9B illustrate further detail of the structure and assembly of the main septum 29 and the extension septum 30, in relation to the baffle back plate 18 and the baffle plates 32 and 33. The septum extension 30 has top and bottom edge fingers 48 and 49 which extend through baffle slots 50 and 51 as assembly guides.

In FIG. 3, this four-picture capability is illustrated in that the septum 29 is shown between the lens units 11 and 12 and as defining, with the baffle plates 32 and 33, image areas 39 and 40 for the shown position of a film sheet 41, and 42 and 43 for the up position of the film sheet. Arrow 44 indicates the movement of the film sheet. Units 45 and 46 represent, respectively, light means for a flash unit and an aiming light.

Figure 4:
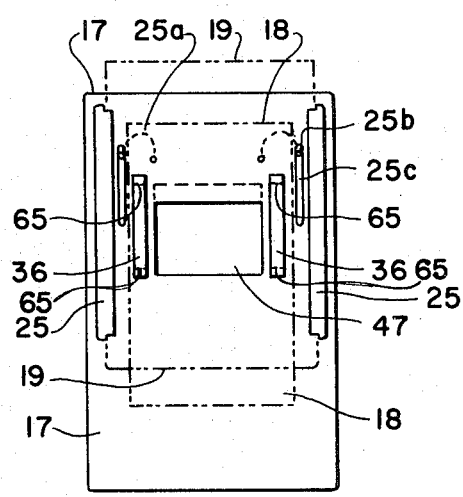
FIG. 4 is a back elevation of a camera back plate and some associated structure, according to this invention.

The FIG. 4 rear view of the back plate 17 illustrates the back plate assembly with a light opening 47. The stops 36 are indicated as in the rear of the back plate in their position of mounting on the back baffle plate 18, which in turn is mounted on the back plate 17.

FIG. 4, further, illustrates the vertical guides 25, mounted on the rear of the back plate 17. The camera back, in assembly, is mounted on these guides for vertical sliding movement between two positions, as located by the ends of the stop bars 36. Cooperating lip formations, as between the camera back 19 and the guides 25, hold the camera back in assembly with the main, front section 10 of the camera. A pair of overcenter springs 25a operate to aid manual movement of the camera back 19 toward either the top or bottom position, and to hold it in such location. The camera back is moved manually from either top or bottom position to the point where the overcenter springs take over to move the camera back the rest of the way to its new position. The springs 25a are pivotally mounted on the front of the back plate, and to connector pins 25b extending rearwardly through vertical slots 25c in the back plate. The camera back 19 secures the ends of the pins 25b, on the rear side of the back plate 17.

FIG. 4, further, illustrates the light opening 47 in a reduced size in adaptation to a smaller than usual size film. The opening for the usual full size is indicated by dotted line 64. These openings are indicated in FIGS. 7 and 8 respectively, as S (small) and L (large). The solid line stop bars 36 are for use with the smaller film and are shown as longer than those used for the usual full size film. The tops and bottoms of the shorter stop bars as used for the usual full size film are indicated at 65. The structure for full size film is one form of this invention and that structure, with built-in adaptation, is another form of this invention. In each instance, the bottom of the film format is arranged for displacement from a point on the optical axes of the lens systems to a point equal to one-half the height of the film format therebelow.

Further detail of the sliding back structure and assembly is shown in FIGS. 16 and 17.

In FIG. 16, the sliding face of the camera back unit 19 is shown. This may be a built-in structure or it may be an adaptor plate attached to the inner part of the camera back. Thus, the unit of FIG. 16 is designated as the camera back unit 19. It is a frame form, with a central opening 80 for framing a sheet of film and for light access to the interior of the main body 10 of the camera system. The unit 19 is provided with sliding strip raised faces 81 and 82, for riding on the rear face of the back plate 17.

A light barrier system comprises a pair of recess mounted cross strips 84 of napped material such as velvet for riding on the face of the baffle plate 18, and a light labyrinth as a side light barrier which is effective whether the camera back is stationary or being moved. This light labyrinth comprises channels 85 with the outturned edges 18A of the back baffle plate 18 lying in these channels without touching. Thus, the channels 85 move along the edges 18A as the camera back is moved. With this light labyrinth structure, the mounting and guiding of the camera back is not dimensionally critical. Such mounting is illustrated in FIG. 17, with some exaggeration of clearances for purposes of illustration. The napped strips 84 are somewhat resilient and to some degree the camera back may thus be held away from the back plate 17 and in sliding engagement with the overhang of the guide rails 25.

FIGS. 5 and 13A, with consideration of FIG. 4, and excepting FIGS. 9, 9A, and 9B, provide comparisons illustrative of adaptation of the twin lens, sliding back camera of this invention to the use of a smaller than usual film pack.

This twin lens, sliding back camera uses a different half of a single sheet of film in the camera back, for each of two positions of the sliding back. Each such half film section provides two side by side image areas, one for each lens system. Accordingly, four photographs may be produced from each sheet of film.

FIG. 15 schematically illustrates one half of a single sheet of full size film for use in a film pack such as that of FIG. 12A. The two images 72 indicate the relative size of photographs intended as an example of use of this invention, and twice the film area 73 is a relative representation of the film area saving when the film pack of FIG. 13A is used.

The adaptation structure of this invention is built into the twin lens, sliding back camera structure to make such camera structure compatible with a smaller than usual film pack. As a result, the total smaller than usual film area is essentially quartered in use, with one image for each quarter, and essentially all of each sheet of film is in significant use.

In these comparisons, it is pointed out that the smaller sizes represent the adaptive structure according to this invention except for the adaptive stop bars, which are larger than the usual. In consideration of the twin lens and sliding back combination, either of the sizes may be used, that is, either all structures are full size, or selected structures are adaptive, with such structures built in in either case suitable lens systems are used, according to the particular purpose.

This adaptation structure comprises: a camera back plate and back baffle plate combination with a smaller than usual light passage opening at least through the baffle plate; a septum extension from the septum between the twin lens light systems, such extension being smaller, less tall, than the usual such extension in the twin lens system, and such smaller septum extension being sized to extend through and fit the smaller than usual light passage through the adaptive combination of the camera back plate and baffle back plate; the top one, 32, of the essentially horizontal baffle plates is in a lower position to aid in defining the reduced size of the light opening in the adaptive baffle plate; a longer than usual set of stop bars for limiting the movement of the camera back to establish two positions thereof consonant with the use of the smaller than usual film pack; and an over-size spring in the camera back for holding the smaller film pack in place within the camera back.

All of the adaptive structural features relate to one selected reduction in size of the film pack. Also, they all relate to displacements of the camera back given distances up and down relative to the optical axes of the twin lens systems.

FIGS. 5 and 6 are a comparison of back baffle plates. FIG. 5 illustrates the back baffle plate 18 for the adaptor structure in that the light opening 18A therethrough is relatively small, as indicated at S. The full size light opening 18B in FIG. 6 is indicated at L. In FIG. 5, the baffle plate 32 is in a lower position than its counterpart, 32A in FIG. 6, to adapt to the smaller size of the light opening 18A. The stop bars 36, to limit the movement of the camera back, are longer in the adaptive baffle back plate of FIG. 5 than their relatively short counterparts 36A in the baffle back plate of FIG. 6 with the full size opening 18B. Since the light opening of FIG. 5 is smaller, and since the stop bars are positioned within the camera back, the camera back travel is less for the smaller film use. Consequently, as in FIG. 5, the stop bars 36 are longer.

FIGS. 7 and 8 are a size comparison by a side view of the adaptive septum extension 30 of FIG. 7, as relatively small, indicated as S, as related to a side view of the full size septum extension 30A of FIG. 8, indicated as large, at L.

The bottom edges of both light openings lie in the same horizontal line, which is the optical axis of the camera. Both light openings have the same width.

Two sizes of film are compared in FIG. 10, full size, in relation to FIG. 11, reduced adaptor size. In each case, the overall camera back is outlined by line 69 and the film area for exposure is quartered by dotted lines indicating areas 1, 2, 3, and 4 defined by the septum, the light baffles, and movement of the back.

In FIG. 10, as full size, the back is in up position with film areas 1 and 2 in line for exposure through the full size light opening as indicated by line 70. Arrow 71 indicates the bottom stop engagement. Dotted line arrow 72 indicates the top stop engagement when the back is moved down, line 73 to line 74, to align film areas 3 and 4 with opening 70. The septum structure applies one lens unit to areas 1 and 3 and the other lens unit to areas 2 and 4, when they are respectively aligned with the opening 70.

In FIG. 11, both the bottom stop, at 71, and the top stop, at 75, have been moved outwardly away from the centerline of the lenses' optical axes. Thus, the back movement is less for the smaller size film in moving small film areas 3 and 4 to alignment with the smaller light opening 76.

FIGS. 12 and 12A illustrate a full size camera back and film pack. The back comprises a frame 52, with a back cover 20 hinged at 21. Within this frame is a peripheral shoulder form 53 on which a film pack rests. The film pack is based at the lower end against a shoulder 54 in the back structure. The film pack is held against this end shoulder by a leaf spring 55 at the other end of the back frame, pressing against the other end of the film pack. The film pack is further secured in place against the peripheral shoulder 53 by a transverse leaf spring 56 on the under side of the cover 20, when such cover is closed. The full size film pack 57 of FIG. 12A is shown in its assembly stance. That is, its upper end 58 is first inserted in the camera back against the spring 55 and then the lower end 59 is snapped into place against the base shoulder 54 of the film pack. Thereafter, the cover 20 is closed, and the spring 56 engages the rear side of the film pack 57.

FIG. 13 shows the structure of FIG. 12 as adapted for use with a smaller film pack. The end spring 60 is larger and extends further along the frame to accommodate the smaller film pack 61 of FIG. 13A by holding it endwise against the inner shoulder 54 of the camera back.

The smaller, adaptor size film pack as shown in FIG. 13A is placed in the camera back of FIG. 13 in the same manner as the pack of FIG. 12A is placed in the camera back of FIG. 12. Both film packs have the same width and depth, or thickness, dimension. The film pack of 13A is, however, significantly shorter and enables the production of four photographs of the desired small size, with minimal film waste. This is done on the basis of minimal cost by using readily available overall camera structure with a readily available small size film pack and with simple, inexpensive, built-in adaptive structure.

In the adaptive combination of FIGS. 13 and 13A, the film pack is based in the camera back at the same point at which the film pack of FIG. 12A is based in the camera back of FIG. 12. This maintains the operationally effective base line situation of proper film placement. This same base line situation is carried forward in the film areas to be exposed. The schematic showings of FIGS. 10 and 11 illustrate this point. In these Figures, the aperture designations 70 and 76 depict the film areas 1 and 2 in position for exposure. When the camera back is moved, the film areas 3 and 4 are displaced into alignment with their respective aperture. In this connection, the camera back is displaced symmetrically across the optical axes of the lenses.

In comparing the full size film pack of FIG. 10 with the smaller pack of FIG. 11, they both bottom at the same location in the same size camera back, and they and their film openings have the same width. However, in the case of the Polaroid Land Film Type 88 depicted in FIG. 13A, the distance $d_2$ (See FIG. 11) between the bottom of the film pack and the bottom of the light sensitive areas of its photographic sheets is greater than the similar dimension $d_1$ (See FIG. 10) in the cases of the Polaroid Pack Film Type 107 and Polacolor Land Film Type 108. For this reason, stop bars 36 depicted in FIG. 5 extend not only above, but also below, their counterparts 36a depicted in FIG. 6.

In the overall camera structure, the optical axes of the twin lens system provide a base line reference. The light openings, film area locations, and the dimensions of the camera, the camera back and the film pack, coupled with the positions of the camera back movement stops and the location of the film pack within the camera back, all relate to such optical axes in such manner as to accomplish effective adaptation of a smaller than usual film pack to a full size camera back and to a full size overall camera structure.

As previously indicated, the smaller film pack depicted in FIG. 13A may comprise that marketed by Polaroid Corporation and identified as Polaroid Land Film Type 88. As such, it includes a pair of protuberances 71. Accordingly, the camera back illustrated in FIG. 13 may be considered a modified version of the Polaroid Model CB–100 Land Camera Back depicted in FIG. 12 in that it comprises a pair of recesses 70 oppositely located in its inner side walls strategically located to receive the protuberances 71 located on the outer side walls of the adaptor size film pack of FIG. 13A whenever such is positioned therein. In terms of the length of the film pack 61, the protuberances 71 are located off-center, in the upper portion of the film pack. Accordingly, the film pack 61 may be inserted into a camera back of the size and general nature of that of FIG. 12, only when it is modified into the form shown in FIG. 13 wherein receptor slots 70 are present. The off-center location of the protuberances 71 assures the proper assembly orientation and stance in placing the film pack in the camera back.

The recesses 70 in the side walls of the camera back are oversize with respect to the protuberances 71 on the side walls of the small film pack, to a degree sufficient to provide non-interference with the spring (60) pressed abutment of the film pack against the inner bottom wall of the camera back, without interfering with identification and location function of such recesses with respect to such protuberances.

Thus, the film pack of FIG. 13A cannot be used with the camera back of FIG. 12, because the protuberances 71 will not allow such assembly. The camera back of FIG. 13 in a camera system can be used to indicate that the system has special structure therein and that the film pack of FIG. 13A is the intended film holder therefor. On the other hand, any camera back can be prepared to receive a film pack of any suitable size and having such protuberances to satisfy the needs of particular purposes.

The adaptive camera system for using smaller than usual film according to this invention is constructed by building the various adaptive structure elements disclosed herein into the general overall structure of a twin lens camera having a sliding back for containing and carrying a full size film pack.

This new twin lens system with a sliding back is capable of producing four photographs from a single sheet of film. For different size photographs or different uses. This twin lens system may also be used for different size photographs with suitable adaptation.

For the specific photographic application of producing a number, such as four, of such small size subject photographs, the adaptation of this twin lens system by simple, unique adaptive structure is accomplished as disclosed herein.

For other photogragphic applications, the assembly of such an adaptive camera back combined with the smaller size film pack can be a useful photographic tool for various systems.

A feature of importance, further, is the mutually related identification and location structure of slots and protuberances as between a camera back and a film pack.

In the use of a camera system according to this invention, a film pack is loaded into the camera back. Thereafter, the camera is first operated with the camera back in one of its two positions to enable the exposure of two areas of the film to the two lens systems. The camera back is then moved to its second position to enable exposure of two other areas of the film.

In this structure and operation, the camera back and film pack combination is a single assembly wherein the camera back and the film pack move together as an integral unit to present different areas of the film to the camera optical system. This single assembly unit is in itself an integral part of the operating camera system, and is open to the interior of the main body of the camera.

This invention thus provides a new and useful multiple photograph camera system wherein the combination of a twin lens system and a sliding, film carrying back enables, for example, the production of four pictures from a single sheet of film.

This invention encompasses such a system in which the usual full size film is used. It also encompasses such a system including structure which adapts it for use with a film of less than such usual size.

This invention further includes the combination of a camera back with a film pack or sheet holder of lesser size than is usual for such camera back.

This invention further includes the combination of a camera back with a film pack or sheet holder of the usual size or of less than usual size, with complementary unique configurations on such back and such pack or holder, for purposes such as mutual identification, location, or orientation.

As many embodiments may be made of the above invention, and as changes may be made in the embodiment set forth above without departing from the scope of the invention, it is to be understood that all matter set forth hereinbefore and in the accompanying drawings is to be interpreted as illustrative only and not in a limiting sense.

I claim:

1. A twin lens identification camera comprising:
   a first section including two parallel optical systems for forming images of subjects positioned in front of said camera system at a focal plane;
   a septum in said first section providing a light passage system of two light passages for said optical systems and for use with a baffle back plate having an opening in continuance of both of said light passages and having a given size in relation to said light passage system;
   a baffle back plate in said first section, including an opening therethrough in continuance of said light passages and provided in a size significantly less than said given size;
   an extension of said septum, sized to fit in said lesser size baffle back plate opening, from said septum, through said lesser size baffle back plate opening, to a point approaching and adjacent said focal plane;
   a second section attached to said first section and including means for mounting a sheet of photographic material at said focal plane, said sheet of photographic material having an area of the order of twice the area of said lesser size baffle back plate opening; and
   means providing relative movement capability between said second section and said optical systems to align first and second portions of said sheet of photographic material with said optical systems.

2. The camera of claim 1, wherein:
   each of said portions of said sheet of photographic material includes two subject image areas, one for each of said optical systems.

3. The camera of claim 1, wherein:
   said second section comprises an assembly of a camera back and a holder for said sheet of photographic material;
   said camera back having a recess in which said holder is mounted, said holder being of significantly less area than the area of said recess.

4. The camera of claim 1, wherein:
   said second section comprises an assembly of a camera back and a holder for said sheet of photographic material;
   said camera back having a recess in which said holder is mounted, said holder being of significantly less area than the area of said recess;
   a spring mounted in said camera back recess to engage and press said holder against a wall of said recess;
   said spring being oversize with respect to the size of spring necessary to secure in said recess a full size holder whose area is of the order of the area of said recess.

5. The camera of claim 1, wherein:
   said second section comprises an assembly of a camera back and a holder for said sheet of photographic material;
   said camera back having a recess in which said holder is mounted, said holder being of significantly less area than the area of said recess; and
   said camera back and said holder being provided with mutually unique configurations which prevent assembly of said holder with a camera back lacking such configuration.

6. The camera of claim 1, wherein:
   said second section comprises an assembly of a camera back and a holder for said sheet of photographic material;
   said camera back having a recess in which said holder is mounted, said holder being of significantly less area than the area of said recess;
   said camera back and said holder being provided with mutually unique configurations which prevent assembly of said holder with a camera back lacking such configuration; and
   said unique configurations comprising side wall openings in said camera back and side wall protuberances on said holder.

7. The camera of claim 1, additionally comprising:
   terminal point stop means for ending said relative movement in each of two directions along the line of such relative movement;
   wherein said stop means are separated along said line of movement a significantly different distance than that compatible with full capability of such relative movement if related to said given size of said baffle back plate opening.

8. The camera of claim 1, wherein:
   said second section comprises an assembly of a camera back and a holder for said sheet of photographic material;
   said camera back having a recess in which said holder is mounted, said holder being of significantly less area than the area of said recess; and
   stop means for engaging said camera back to limit such relative movement in each of two directions of such movement;
   wherein said stop means comprises two stop elements, separated along the line of such movement a significantly greater distance than that compatible with full capability of such relative movement if related to the said given size of said baffle back plate opening.

9. The camera of claim 1, wherein:
   said second section comprises an assembly of a camera back and a holder for said sheet of photographic material;
   said camera back having a recess in which said holder is mounted, said holder being of significantly less area than the area of said recess; and
   stop means for engaging said camera back to limit such relative movement in each of two directions of such movement;
   wherein said stop means comprises two bars as stop elements with their ends as stop positions;
   each of said bars being secured to said baffle back plate and located within the compass of said back recess, and each of said bars being of significantly greater length than that compatible with the full capability of such relative movement if related to said given size of said baffle back plate opening.

10. The camera of claim 1, additionally comprising:
    a spring included in said means for so mounting said sheet of photographic material; and
    a pair of elongate stops to limit said movement capability; and wherein;
    the size of said septum extension;

the size of said sheet of photographic material;
the length of said stops; and
the size of said spring; are all compatible with:
the said given size of said opening in said baffle back plate.

11. A two lens camera for providing a plurality of identification photographs on a single sheet of photographic material, said camera comprising:
a first section;
objective lens means positioned in said first section;
a back for carrying a photographic sheet of a given size and including aperture defining means to facilitate the exposure of the entire photographically useful portion of such a photographic sheet;
means for mounting said back on said first section for reversible sliding movement between two terminal positions with respect thereto so as to alternately position different halves of such a photographic sheet in operative relationship with said objective lens means;
means adapting said camera for use with a size of photographic sheet which is less than said given size of such first-mentioned photographic sheet;
said adapting means comprising structure which reduces the size of portions of light passages in said camera and stop means which reduces the terminal positions between which said back may be slidably moved relative to said first section.

12. In a camera system for taking four pictures by forming images on each of four different areas of a single sheet of photographic material, wherein said camera system comprises:
a first section including two optical systems;
a septum dividing said first section into two light passages, one for each of said optical systems;
a camera back plate on said first section with a light aperture encompassing both said light passages;
a camera baffle back plate mounted on said camera back plate with a light aperture also encompassing both said light passages and provided with baffle plates as extensions of said light passages;
a septum extension mounted in continuance of said septum and extending through said camera back plate and camera baffle back plate apertures as an extension of said division of said first section into two light passages;
a second section attached to said first section for containing said sheet of photographic material and movable a given distance on said first section with respect to said optical systems;
a film pack, spring mounted in said second section, for presenting each of two portions of such single sheet of photographic material to said optical systems in accordance with said movement of said second section; and
means for adapting said camera system to the use of a film pack, and consequently a sheet of photographic material, which is smaller than the maximum size capable of being received in effective use in said second section.

13. The camera system of claim 12, in which said adaptation means comprises:
a lesser size opening in said back plate;
a lesser size opening in said baffle back plate;
a lesser size septum extension;
a new placement of one of said baffle plates;
a larger spring in said second section for holding said smaller film pack in place; and
stop means for limiting said movement of said second section to a lesser distance;
all consonant with the size of said smaller photographic sheet.

14. The camera system of claim 12 wherein:
said second section is a camera back with a frame support for a film pack holding said photographic sheet; and
said spring mounting of said film pack is a leaf spring applied to one end of said film pack for resilient holding bias of said film pack along said frame and against an end abutment of said frame.

15. A twin lens camera system comprising:
a first section including a pair of parallel optical systems for forming images of subjects positioned in front of said camera system at a focal plane;
a second section, attached to said first section and including means for mounting a sheet of photographic material at said focal plane;
means for providing light access between said sections through which said images are formed at said focal plane;
means for dividing said first section into individual light passages for light paths of each of said optical systems, with said dividing means extending to a point adjacent said focal plane;
means for enabling relative movement between said sections in said attachment and between positions to present different areas of said photographic sheet to said optical systems, while maintaining said light access between said sections, said second section being mounted on said first section for and directly accessible to manual initiation of said movement of said sections;
overcenter spring means connected between said sections in aid of portions of said manual movement;
elongate stop bar means mounted on said first section and located within said second section for end engagements with abutments in said second section as determinative of said position; and
light barrier means between said sections in the form of spaced overlapping members provided for relative movement in consequence of said movement between said sections, without contact between said overlapping members.

16. A twin optical system camera comprising:
a sliding back for selectively aligning said twin optical systems with different areas of one size of a sheet of photographic material, mounted in a first size film magazine, in said back, said sliding back being provided with a recess for receiving a film magazine;
whereby at one position of said sliding back, one edge of one of said areas of said sheet defines a reference line location for said sheet with respect to said alignment of said sheet areas with said optical systems; and
adapter means for enabling the use of another size sheet of photographic material, mounted in a second size film magazine, in said camera, also with alignment capability of different areas of said other size sheet with said optical systems;
said adaptor means including means for locating and holding said second size film magazine in said sliding back, with one edge of one of each of said different areas of said other size sheet positionable at said reference line location, said locating and holding means including a spring mounted in said recess for engaging a film magazine and biasing said magazine against one wall of said recess to achieve said reference line position.

17. A camera comprising:
a first section including at least one optical system for forming images of subjects positioned in front of said camera system at a focal plane;
means in said first section for defining a light passage system for said optical system and arranged for use with a baffle back plate having an opening in continuance of said light passage, said opening having a given size in relation to said light passage system to facilitate the formation of an image at said focal plane of a given height;
a baffle back plate in said first section including an opening therethrough in continuance of said light passage and provided in a size significantly less than said given size;
an extension of said light passage system defining means sized to conform with said lesser size baffle back plate opening and extending from said lesser size baffle back plate opening to a point approaching an adjacent said focal plane wherein it defines an area having a height less than said given height;
a second section attached to said first section and including means for mounting a sheet of photographic material at said focal plane, said sheet of photographic material having an area the height of which is on the order of twice the height of the area defined by said extension of said focal plane;
means for providing relative movement capability between said second section and said first section to alternately align first and second portions of said sheet of photographic material with the area defined by said extension; and
terminal point stop means for ending said relative movement in each of two directions along the line of such relative movement, said stop means being separated along said line of movement a distance consonant with the height of said photographic material area and which differs significantly from the distance similar stop means would be separated along said line of movement to be compatible with the full capability of such relative movement as related to said given size baffle back plate opening.

18. Camera apparatus alternately useful in film exposure operations with a first substantially flat film pack of relatively large unexposed film units, such first film pack including a pair of side walls of a given length spaced apart a given distance, or a second substantially flat film pack of relatively smaller unexposed film units, such second film pack having a pair of side walls of a length less than such given length spaced apart a distance equal to such given distance, such second film pack additionally including a pair of protuberances each extending outwardly of a respective one of its such side walls, said camera apparatus comprising:
means for defining an opening of sufficient size through which light rays may enter a such first film pack to effect the exposure of substantially the entire photographically useful area of such film units retained therein; and
means for alternately receiving and mounting either a such first film pack and a such second film pack in operative relationship with respect to said opening defining means, said receiving and mounting means including a base shoulder, a spring spaced from said base shoulder a predetermined distance so that at least a such first film pack or a such second film pack may be disposed lengthwise therebetween with said spring yieldably urging it against said base shoulder, and a pair of spaced apart substantially parallel elements positioned to extend lengthwise of a such first film pack and a such second film pack when either is operably positioned in said receiving and mounting means, each said element having a recess formed therein configured and located to accommodate a respective one such protuberance when a such second film pack is inserted into said camera apparatus.

19. Camera apparatus alternately useful in film exposure operations with a first substantially flat film pack of relatively large unexposed film units, such first film pack including a pair of side walls of a given length spaced apart a given distance, or a second substantially flat film pack of relatively smaller unexposed film units, such second film pack having a pair of side walls of a length less than such given length spaced apart a distance equal to such given distance, such second film pack additionally including a pair of protuberances each extending outwardly of a respective one of its such side walls, said camera apparatus comprising:
means for defining an opening of sufficient size through which light rays may enter a such first film pack to effect the exposure of substantially the entire photographically useful area of such film units retained therein; and
means for alternately receiving and mounting either a such first film pack and a such second film pack in operative relationship with respect to said opening defining means, said receiving and mounting means including a base shoulder located to support at least a such first film pack or a such second film pack when it is operably positioned within said camera apparatus and a pair of spaced apart substantially parallel elements positioned to extend lengthwise of a such first film pack and a such second film pack when either is operably positioned in said receiving and mounting means, each said element having a recess formed therein configured and located to accommodate a respective one such protuberance when a such second film pack is inserted into said camera apparatus.

20. The camera apparatus of claim 19 wherein said base shoulder is located to support a such first film pack when it is operably positioned within said camera apparatus and a such second film pack when it is operably positioned within said camera apparatus.

21. Camera apparatus alternately useful in film exposure operations with a first substantially flat rectangularly shaped film pack of relatively large unexposed film units, such first film pack including a pair of side walls of a given length spaced apart a given distance, or a second substantially flat rectangularly shaped film pack of relatively smaller unexposed film units, such second film pack having a pair of side walls of a length less than such given length spaced apart a distance equal to such given distance, such second film pack additionally including a pair of protuberances each extending outwardly of a respective one of its such side walls, said camera apparatus comprising:

means for defining an opening of sufficient size through which light rays may enter a such first film pack to effect the exposure of substantially the entire photographically useful area of such film units retained therein when a such first film pack is disposed in operative relationship with respect to said opening defining means; and means for alternately receiving and mounting either a such first film pack and a such second film pack in operative relationship with respect to said opening defining means, said receiving and mounting means including means, comprising a pair of side walls and a base shoulder extending therebetween, for defining a substantially rectangular recess sized to receive and support a such first film pack with a portion of such first film pack seated against said base shoulder, said side walls of said camera apparatus being disposed in close adjacency with respective such side walls of such first film pack when a such first film pack is mounted in said camera apparatus, each said side wall of said camera apparatus having a recess formed therein configured and located to accommodate a respective one such protuberance when a such second film pack is inserted into said camera apparatus.

22. An identification camera system for producing a plurality of subject photographs on a single sheet of photographic material, with each such photograph occupying a different area of such photographic sheet, said camera system comprising:

a first section including two optical systems each for forming an image in different areas of the same focal plane;

a second section attached to said first section and including means for mounting a sheet of photographic material in said focal plane, such photographic sheet being of a size at least sufficient to provide a different area for each of four such images;

septum means in said first section for dividing said first section into two separate light chambers one of which serves one of said optical systems and the other of which serves the other of said optical systems;

means for achieving relative movement between said second section and said optical systems to present first and second areas of such sheet of photographic material to one of said optical systems and third and fourth areas of such sheet of photographic material to the other of said optical systems, whereby said first and third areas may be first exposed to record an image on each and, after said second section has been moved with respect to said optical systems, said second and fourth areas may be exposed to record an image on each;

said second section comprising a camera back for receiving a photographic sheet of a size less than the maximum which said camera back is capable of receiving; and adaptor means for operatively including said lesser size photographic sheet in said system, said adaptor means comprising:

an oversize spring in said second section to hold said lesser size sheet;

a camera back plate assembly with a light aperature of reduced size;

a baffle plate on said camera back plate in a new position consonent with said reduced size of said back plate light aperature;

a septum extension through said light aperatures with said septum extension reduced in size consonent with said reduction in size of said aperature; and stop means for limiting said relative movement between said second section and said optical systems to a lesser distance consonent with said lesser size of said photographic sheet.

* * * * *